United States Patent Office 3,262,997
Patented July 26, 1966

3,262,997
BUTYL RUBBER-POLYOLEFINE BLENDS
Douglas Cameron Edwards and John Walker, Sarnia, Ontario, Canada, assignors to Polymer Corporation Limited, Sarnia, Ontario, Canada, a body corporate
No Drawing. Filed Apr. 27, 1964, Ser. No. 362,978
Claims priority, application Canada, May 3, 1963, 874,657
25 Claims. (Cl. 260—889)

This invention relates to the preparation of novel vulcanizates of blends of butyl rubber and solid polyethylene or a solid homopolymer of a $C_3$–$C_5$ alpha-monoolefine.

The vulcanization of butyl rubbers conventionally has been carried out by the application of sulphur, quinoid or dimethylol phenol resin-based curing systems. Polyethylene and the homopolymers of $C_3$–$C_5$ alpha-monoolefine however will not respond to these curatives. It has recently become known that these polyolefins can be crosslinked by the application of organic peroxides or peresters in combination with high temperatures. When organic peroxides or peresters were applied to the vulcanization of butyl rubbers, it was found that these polymers were either degraded or the resulting vulcanizates possessed poor physical properties and unpleasant peroxide-caused odours. Still more recently it has become known that halomelamines have the ability to crosslink butyl rubbers and that their effectiveness is enhanced by the additional presence of metal compounds such as zinc oxide, zinc sulphide, zinc sulphate, etc.

We have found that by hot masticating a blend of polyethylene or a homopolymer of a $C_3$–$C_5$ alpha-monoolefine and butyl rubber with a halomelamine, especially in the additional presence of a metal compound such as zinc oxide, an interaction between the two polymers is caused to take place and that the resulting products have better ozone resistance, processing characteristics and a more attractive balance of physical properties than polyethylene-butyl rubber blends which have not been hot masticated with the halomelamine. Such products possess good chemical, oil and fuel resistance and are particularly suitable for use as insulation materials in electrical wire and cable applications.

According to the invention a process comprising blending 5–59 parts by weight of a solid polyethylene, 95–5 parts by weight of a rubbery copolymer of isobutylene and at least one copolymerizable $C_4$–$C_{14}$ diolefine hydrocarbon containing 80–99.9 mole percent copolymerized isobutylene, and 0.1–3.0 parts by weight per 100 parts by weight of total polymers of a halomelamine, masticating the blend at 120–200° C. for 1–30 minutes, lowering the temperature of the masticated blend to a point where vulcanization of the rubbery isobutylene-diolefinic hydrocarbon copolymer is substantially negligible, mixing into the cooled blend a vulcanizing agent for the rubbery isobutylene-diolefinic hydrocarbon copolymer component of the blend and shaping and vulcanizing the thus prepared blend.

The isobutylene-diolefine copolymer preferably comprises 50–70% by weight of the blend.

In a preferred form of the invention a metal compound which is preferably zinc oxide is present in the blend during the hot mastication step. The discovery that the presence of zinc oxide is desirable during the hot mastication step is surprising since it is known that zinc oxide retards the promoting effect of halomelamines on butyl rubbers alone.

In a modification of the process the isobutylene-diolefine copolymer is blended with a solid homopolymer of a $C_3$–$C_5$ alpha-monoolefine instead of with the solid polyethylene. When the monoolefin is propylene the isobutylene diolefine copolymer preferably comprises 75–80% of the blend. Thus, while the process is particularly suitable for application to blends of polyethylene and isobutylene-diolefine copolymer rubbers, it may also be advantageously applied to blends of these rubbers with the aforesaid higher monoolefins. The higher the molecular weight of the monoolefin, the more difficult it is to homopolymerize the monomer into a solid polymer and with $C_6$ monomers excessively large amounts of low molecular weight homopolymers are formed. As with polyethylene both amorphous and crystalline homopolymers may be employed.

In a preferred form of the invention, the butyl rubber and polyethylene ar blended on a mill or in an internal mixer at a temperature which is preferably above the final crystalline melting point of the polyethylene. The halomelamine and metal oxide are next incorporated into the polymer blend following which the temperature of the blend is raised to 120° C.–200° C. and the blend is subjected to mastication for 1–30 minutes, with the longer mastication times being required at the lower temperatures.

Polyethylene is available commercially in two basic forms—the higher density material prepared at lower temperatures and pressures with the aid of the more recently discovered Ziegler catalysts, and the lower density material which has been known for a longer period of time and which is prepared at higher temperatures and pressures. The high density polyethylenes have densities of about 0.94–0.97 at 25° C. and final crystalline melting points of about 125° C.–135° C., while the low density polyethylenes normally have densities of about 0.91–0.93 and final crystalline melting points of about 105° C.–120° C. While both high and low density solid polyethylenes can be used in the present invention, the low density material is preferred since it blends more easily with the butyl rubber and imparts somewhat better extrusion and finishing characteristics to the blends as well as superior flexibility in the finished products. The polyethylene may be halogenated, i.e. chlorinated.

Butyl rubbers may be defined as polymers prepared by the copolymerization of 80–99.9 mole perecnt of isobutylene with 0.1–20 mole percent of one or more copolymerizable diolefinic hydrocarbons having 4–14 carbon atoms per molecule. Examples of such diolefinic hydrocarbons are butadiene-1,3, 2-methylbutadiene-1,3, pentadiene-1,3, cyclopentadiene, dicyclopentadiene, cyclo-octadiene-1,4, 2-methyl-hexadiene-1,5, 6-methyl-heptadiene-1,5, etc. 2-methylbutadiene-1,3 more commonly known as isoprene, is the most generally preferred diolefin. The copolymerization reactions are normally carried out at very low temperatures e.g. −70° C. to −120° C. in an inert solvent for the monomers, such as methyl chloride, with the aid of a Friedel-Crafts catalyst as exemplified by aluminum chloride. In commercially available butyl rubbers the mole percent unsaturation varies from about 0.7 to about 3.0 although butyl rubbers having lower and higher mole percent unsaturations have been prepared. In applications requiring polymer flexibility and high ozone resistance, the slow curing lowest unsaturation butyl rubbers normally are used. The present invention permits the employment of the faster curing higher unsaturation butyl rubbers with no particular penalty in ozone resistance and with the added advantages of better dimensional stability, hardness, tear strength and solvent, water and electrical resistance. The butyl rubbers may also be halogenated e.g. chlorinated, and the halogenated rubbers used herein.

Of the halomelamines, trichloromelamine is preferred for modifying the polymer blend during the high temperature mastication step. The amount employed may vary from 0.1–3.0 parts per 100 parts by weight of total polymers but best results will be obtained when using about 0.2–1.75 parts of trichloromelamine. While metal compounds such as zinc oxide, zinc sulphate, zinc sulfide, lead oxide, magnesium oxide, etc. may be employed in conjunction with the trichloromelamine, zinc oxide is preferred. Its usage may vary widely, say 0.5–20 parts per 100 parts by weight of total polymers, but 0.5–10 parts should be adequate for most applications and is preferred for best results. It is preferred that the zinc oxide be added together with the trichloromelamine, although satisfactory results may be obtained if it is added later during the high temperature mastication step or even afterwards, but this latter is not as desirable.

As indicated earlier, the high temperature mastication is carried out at 120° C.–200° C. for 1–30 minutes with the longer times being employed usually at the lower temperatures. Mastication temperatures in the range of 120–180° C. in combination with mastication times in the range of 5–20 minutes are preferred.

On completing the hot mastication step, the temperature of the blend is lowered and there is next uniformly incorporated into it an agent which is effective for vulcanizing the butyl rubber portion of the blend. Such agents are the various butyl rubber vulcanizing systems which are well known in the art. As stated previously, sulfur, quinoid and resin-based curing systems are most commonly used. The vulcanizing agent is normally employed in amounts ranging from 0.1 to 15 parts per 100 parts by weight of butyl rubber and is most conveniently incorporated at a temperature of about 80–105° C., although temperatures as high as 115° C. or lower than 80° C. might safely be used in some cases depending on the activity of the vulcanizing agent and the stiffness of the polymer blend. In the sulfur-based systems it is usually desirable to have an activator such as zinc oxide and an accelerator present. The accelerator may be one or more of compounds such as an alkyl thiuram sulfide exemplified by tetramethyl thiuram disulfide and tetraethyl thiuram disulfide; an aromatic thiazyl sulfide such as benzothiazyl disulfide; a metal alkylthiocarbamate such as selenium dimethyldithiocarbamate and zinc dibutyldithiocarbamate; a softener-accelerator such as stearic acid, etc. In the quinoid-based systems an oxidizing agent is usually present. Quinoid vulcanizing agents include paraquinone dioxime and dibenzoyl paraquinone dioxime and the oxidizing agents employed with them include inorganic and organic oxidizers such as a lead oxide and benzothiazyl disulfide. The resin type vulcanizing agents are exemplified by the multicyclic phenol dialcohols and their metal salts such as 4-phenyl, 4-octyl and 4-tertiarybutyl derivatives of 2,6-dimethylol phenol and their zinc salts. They may be halogen modified, such as with bromine and chlorine. An example of the latter is 2,2'-methylene-bis-(4-chloro-6-methylol phenol). Activators are usually employed with the resins, such as stannous chloride dihydrate, N-bromosuccinimide, dibromodimethyl hydantoin, polymeric 2-chlorobutadiene-1,3, brominated copolymers of isobutylene and isoprene, chlorosulfonated polyethylene, etc.

In addition to the butyl rubber vulcanizing systems, various other materials including fillers such as carbon blacks, and especially thermal blacks, clays, silicas, etc.; softeners such as waxes, resins, oils, etc.; colouring pigments; antioxidants, etc., may be incorporated into the blends. The criteria for the amounts and types of vulcanizing systems and other materials used are well known in the art and their usage is determined by the processing conditions and the intended application of the final vulcanizate.

After the polymer blend has been compounded, it is shaped to the desired configuration and heated to effect the vulcanization. The time and temperature to which the compounded stock must be heated to effect vulcanization is variable, depending on the degree of activity of the vulcanization system, dimensions of the material being vulcanized, the properties desired in the final vulcanizate, etc. Generally, it is necessary to heat the compound to a temperature of 135–200° C. Within this range the desired degree of vulcanization will be obtained in most cases within the time period of less than one minute to two hours, although in some cases a longer time may be required. Where mold cures are employed it is noted that those compositions of the invention containing butyl rubber as the major proportion of the polymer blend, may be stripped from the mold after vulcanization while hot, as opposed to the necessity for cooling after vulcanization for comparable 100% polyethylene compounds. Furthermore the butyl-polyethylene blends of the invention are superior to the 100% polyethylene compounds in handling and processing characteristics, the former being readily formed and pliable while the latter are often stiff and boardy at room temperature, particularly if substantial amounts of filler are incorporated.

The following examples are presented to illustrate the invention. All parts are by weight unless noted otherwise.

EXAMPLE 1

A blend of a butyl rubber with a low density polyethylene was prepared on a laboratory mill. The butyl rubber was a copolymer of isobutylene and isoprene and was characterized by having 3.0 mole percent unsaturation and an ML–8'–100° C. Mooney of 45. The polyethylene had a density of 0.914, a melt index of 7.8 and a melting point of 106° C. The blend was prepared by banding the butyl rubber on a mill the rolls of which were set at a temperature of about 125° C. and then mixing in the polyethylene to obtain a uniform blend of the two polymers. The blend was divided into three portions. One of the portions was set aside. To the second there were added two parts of trichloromelamine and to the third two parts of trichloromelamine and five parts of zinc oxide. The temperature of the mill rolls was raised to about 155° C. and each of the three portions was milled for 20 minutes. A sample of each was tested for solubility in benzene (25° C.), and hot (130° C.) and cold (25° C.) Decalin. The results are summarized in Table I.

Table I

| Sample | A | B | C |
| --- | --- | --- | --- |
| Butyl rubber | 60 | 60 | 60 |
| Polyethylene | 40 | 40 | 40 |
| Trichloromelamine | | 2 | 2 |
| Zinc oxide | | | 5 |
| Insoluble in benzene, percent | 44 | 56.5 | 94 |
| Insoluble in hot Decalin, percent | 0 | (1) | 40 |
| Insoluble in cold Decalin, percent | 41 | 54 | 23 |
| Soluble in cold Decalin, percent | 59 | 46 | 37 |

[1] Opalescent.

Since butyl rubber is soluble and polyethylene is insoluble in benzene, the values indicate that sample A remained essentially unchanged during the hot mastication; sample B contains an interaction product insoluble in benzene, and sample C contains much more of this insoluble interaction product of polyethylene and butyl rubber.

Both butyl rubber and polyethylene are soluble in hot Decalin but only the butyl rubber remains soluble when the solution is cooled to room temperature. The values for solubility in Decalin indicate that sample A remained unchanged during the hot mastication step, sample B was modified to contain an insoluble interaction product of butyl rubber and polyethylene and sample C contains much more insoluble interaction product. Thus, the modifying action of the trichloromelamine is apparent.

EXAMPLE 2

The butyl rubber and polyethylene employed in Example 1 were blended together then mixed with various proportions of trichloromelamine and zinc oxide. Each mixture was masticated on a hot mill at about 155° C. for 15 minutes. After cooling, each was compounded on a cool mill set at 25° C. with a further 5 parts of zinc oxide, 1 part of stearic acid, 100 parts of Whitetex #2 (registered trademark for an electrical grade calcined silicate clay filler) and 23.6 parts of Kenmix AC-104 (registered trademark for a curative mixture consisting of 25.5% by weight of p,p'-dibenzoyl quinone dioxime, 42.5% by weight of red lead, 2.0% by weight of sulfur and 30.0% by weight of an aromatic hydrocarbon resin plasticizer identified by the registered trademark Kenflex N). Triangular sections of each compound were extended and cured for 40 minutes at 145° C. then tested for ozone resistance at 49° C. and 25 parts ozone per 100 million of air at various strains by the method described in the article entitled "Exposure Cracking of Sidewall Compounds" by D. C. Edwards and E. B. Storey in Rubber Age, 79, 787 (1956). The results are summarized in Table II.

*Table II*

|  | 1 | 2 | 3 | 4 | 5 |
|---|---|---|---|---|---|
| Butyl rubber | 80 | 80 | 80 | 80 | 80 |
| Polyethylene | 20 | 20 | 20 | 20 | 20 |
| Zinc oxide |  | 0 | 2.5 | 0 | 5.0 |
| Trichloromelamine |  | 1 | 2 | 2 | 2 |

Masticate at 155° C. for 15 minutes with ¾ cuts each minute

| Zinc oxide | 5 | 5 | 5 | 5 | 5 |
|---|---|---|---|---|---|
| Stearic acid | 1 | 1 | 1 | 1 | 1 |
| Whitetex #2 | 100 | 100 | 100 | 100 | 100 |
| Kenmix AC-104 | 23.6 | 23.6 | 23.6 | 23.6 | 23.6 |

Cure for 40 minutes at 145° C.

| Ozone resistance—time in hours to first crack at strain: | | | | | |
|---|---|---|---|---|---|
| 0-10% | >500 | >500 | >500 | >500 | >500 |
| 10-20% | 240 | >500 | >500 | >500 | >500 |
| 20-30% | <96 | 96 | 240 | 240 | 336 |
| 30-40% | <96 | 96 | 240 | 168 | 240 |
| Threshold strain, percent | 13 | 23 | 28 | 27 | 28 |
| Deepest crack in inches after 500 hours exposure to ozone at strain: | | | | | |
| 0-10% |  |  |  |  |  |
| 10-20% | 0.03 |  |  |  |  |
| 20-30% | 0.07 | 0.01 | [2] 0.01 | [1] 0.01 | [2] 0.01 |
| 30-40% | 0.08 | 0.07 | [2] 0.01 | [1] 0.01 | [2] 0.01 |

[1] Cracks visible to naked eye.
[2] No cracks visible to naked eye.

Compound #1 was the untreated control blend. The data show the marked improvement in ozone resistance imparted to the blends by the hot mastication treatment with trichloromelamine with and without the zinc oxide. The threshold strain values are significant in showing that crack initiation can be almost entirely stopped up to 40% strain by the treatment.

EXAMPLE 3

A low density polyethylene having a melt index of 2.0 and a density of 0.92 was blended in various ratios with two butyl rubbers which were copolymers of isobutylene and isoprene. The first was characterized by an unsaturation of 3.0 mole percent while the second had a 0.7 mole percent unsaturation. They each had an ML-8-100° C. Mooney value of 45. Each of the blends was prepared in an internal mixer maintained at about 138° C. so that the resulting dump temperatures for the compounded blends were about 163° C. Each blend was masticated for 9.5 minutes with 2 parts of Pronar (registered trademark for a mixture believed to contain 50 parts hexachloromelamine and 50 parts inert base) and 5 parts of zinc oxide. Half of the fillers were added at the 2 minute point of the 9.5 minute hot mastication cycle with the other half of the fillers plus 1 part of stearic acid being added at the four-minute point. The stock was dumped after a total elapsed mastication time of 9.5 minutes and allowed to cool. The Kenmix curative was blended into the heat treated mixture on a cold mill and samples were vulcanized for 10 minutes at 165° C. and the physical properties of the vulcanizates were measured. The results are recorded in Table III.

*Table III*

|  | 1 | 2 | 3 | 4 | 5 | 6 |
|---|---|---|---|---|---|---|
| Polyethylene | 20 | 40 | 60 | 20 | 80 | 40 |
| Butyl rubber (3.0 mole percent unsaturation) | 80 | 60 | 40 |  |  | 60 |
| Butyl rubber (0.7 mole percent unsaturation) |  |  |  | 80 | 20 |  |
| Pronar | 2 | 2 | 2 | 2 | 2 |  |
| Zinc oxide | 5 | 5 | 5 | 5 | 5 | 5 |
| Whitetex #2 | 100 | 100 | 100 | 100 | 100 | 100 |
| Carbon black (EPC) | 15 | 15 | 15 | 15 | 15 | 15 |
| Stearic acid | 1 | 1 | 1 | 1 | 1 | 1 |
| Kenmix AC-104 | 18.9 | 18.9 | 18.9 | 18.9 | 18.9 | 18.9 |
| Compound Mooney (ML-4-100° C.) | 72 | 100 | 85 | 47 | 56 | 94 |
| Mooney scorch time (minutes at 125° C.) | 10 | 13 | 16 | 13 | 14 | 17 |
| Vulcanizate properties (10 minute cure at 165° C.): | | | | | | |
| Hardness (instantaneous Shore A₂) | 77 | 90 | 95 | 75 | 89 | 80 |
| Modulus (p.s.i. at 100% elongation) | 550 | 730 |  | 490 | 690 | 620 |
| Tensile strength (p.s.i.) | 700 | 770 | 990 | 720 | 820 | 640 |
| Elongation at break (percent) | 290 | 210 | 60 | 400 | 300 | 310 |
| Tear strength (lbs./in.) | 130 | 100 | 100 | 90 | 110 | 155 |

These results indicate that the treated blends can be compounded to produce vulcanizates having adequate physical properties for use in wire and cable applications.

EXAMPLE 4

80/20 blends of the 3.0 mole percent unsaturation butyl rubber and polyethylene of Example 3 were masticated, compounded, vulcanized as in Example 3 except that the hot mastication was carried out at three temperture levels in an internal mixer set at 121° C., 138° C. and 154° C. The resulting dump temperatures for the compounds were 132° C., 163° C. and 177° C. respectively. The data summarized in Table IV indicate that temperatures in the range of about 120° C.–180° C. can be employed in the heat mastication step with the hexachloromelamine and still obtain good properties in the resulting vulcanizates.

*Table IV*

|  | 1 | 2 | 3 |
|---|---|---|---|
| Mixer temperature, ° C. | 121 | 138 | 154 |
| Dump temperature, ° C. | 132 | 163 | 177 |
| Compound Mooney (ML-4-100° C.) | 76 | 72 | 75 |
| Mooney scorch time (minutes at 125° C.) | 11 | 10 | 11 |
| Vulcanizate properties (10 minutes cure at 165° C.): | | | |
| Hardness (instantaneous, Shore A₂) | 80 | 77 | 76 |
| Modulus (p.s.i. at 100% elongation) | 560 | 550 | 570 |
| Tensile strength (p.s.i.) | 740 | 700 | 700 |
| Elongation at break (percent) | 350 | 290 | 280 |
| Tear strength (pounds/inch) | 140 | 130 | 120 |

EXAMPLE 5

Ten blends of an 80/20 ratio of butyl rubber having a 3.0 mole percent unsaturation and an ML-8-100° C. Mooney of 45 and a polyethylene having a density of 0.92 and a melt index of 2.0 were prepared. Each was hot masticated, compounded, vulcanized and tested as in Example 3 except that various amounts of Pronar and zinc oxide were employed in the hot mastication step. The results are summarized in Table V.

Table V

|  | 1 | 2 | 3 | 4 | 5 | 6 | 7 | 8 | 9 | 10 |
|---|---|---|---|---|---|---|---|---|---|---|
| Pronar | 0.50 | 0.50 | 0.50 | 1.0 | 1.0 | 1.0 | 2.0 | 2.0 | 2.0 | 3.5 |
| Zinc oxide | 2.0 | 5.0 | 10.0 | 2.0 | 5.0 | 10.0 | 0.0 | 5.0 | 10.0 | 5.0 |
| Compound Mooney (ML-4-100° C.) | 45 | 76 | 78 | 77 | 79 | 76 | 72 | 80 | 81 | 80 |
| Mooney scorch (minutes at 125° C.) | 14 | 14 | 13 | 14 | 13 | 13 | 9 | 12 | 9 | 12 |
| Vulcanizate properties (10 minutes cure at 165° C.): |  |  |  |  |  |  |  |  |  |  |
| Hardness (instantaneous, Shore A₂) | 80 | 79 | 77 | 80 | 80 | 80 | 73 | 77 | 80 | 79 |
| Modulus (p.s.i. at 100% elongation) | 590 | 560 | 560 | 610 | 600 | 600 | 510 | 550 | 660 | 650 |
| Tensile strength (p.s.i.) | 740 | 710 | 700 | 740 | 670 | 710 | 700 | 700 | 790 | 760 |
| Elongation at break (percent) | 350 | 310 | 300 | 300 | 300 | 300 | 380 | 290 | 260 | 270 |

The physical properties of the vulcanizates are seen to be satisfactory.

EXAMPLE 6

A low density polyethylene having a melt index of 2.0 and a density of 0.92 was blended on a mill at about 120° C. with a butyl rubber which was an isobutylene-isoprene copolymer characterized by an unsaturation of 3.0 mole percent and an ML-8-100° C. Mooney value of 45. After cooling, trichloromelamine and zinc oxide were added to the blends of a mill with roll temperatures held at 30-35° C. The mixtures were then hot milled for 20 minutes with the mill roll temperatures set at 150° C. After cooling, each hot-milled mixture was compounded on a cool mill, vulcanized and tested as indicated in Table VI.

Table VI

|  | 1 | 2 |
|---|---|---|
| Butyl rubber | 60 | 60 |
| Polyethylene | 40 | 40 |
| Zinc oxide |  | 2 |
| Trichloromelamine |  | 1 |
| Masticate at 120° C. for 20 minutes |  |  |
| Zinc oxide | 5 | 5 |
| Stearic acid | 1 | 1 |
| Whitetex #2 | 100 | 100 |
| Kenmix AC-104 | 23.6 | 23.6 |
| Mooney viscosity of uncompounded blend: |  |  |
| ML-8-100° C | 116 | 108 |
| ML-8-120° C | 44.5 | 40 |
| Extrusion of filled compound (without Kenmix AC-104), linear rate at constant finished cross-sectional area, inches per minute at 120° C | 70 | 79 |
| Mooney scorch, 5 point rise at 125° C., minutes | 7.0 | 8.2 |
| Tensile strength, 40 minute cure at 144° C., p.s.i. | 840 | 890 |
| Elongation at break, percent | 235 | 200 |
| Ozone resistance, time in hours to first crack at strain: |  |  |
| 0-10% | >500 | >500 |
| 10-20% | >500 | >500 |
| 20-30% | 168 | >500 |
| 30-40% | 168 | >500 |
| Threshold strain, percent | 23 | >40 |
| Deepest crack in inches after 500 hours' exposure to ozone at strain: |  |  |
| 0-10% | 0 | 0 |
| 10-20% | 0 | 0 |
| 20-30% | 0.12 | 0 |
| 30-40% | 0.17 | 0 |

These results illustrate the improved ozone-resistance, processing characteristics and good balance of physical properties possessed by the blends of this invention.

EXAMPLE 7

40 parts of a low density polyethylene having a melt index of 2.0 and a density of 0.92 were blended with 60 parts of a butyl rubber having a mole percent unsaturation of 3.0 and an ML-8-100° C. Mooney value of 45. The blend was hot masticated with 1 part of trichloromelamine and 5 parts of zinc oxide for 7.5 minutes in an internal mixer set at 138° C. Half of the fillers, which consisted of 100 parts of Whitetex #2 and 15 parts of an EPC carbon black, were added at the 2-minute point with the other half of the fillers plus 3.0 parts of microcrystalline wax, 3.0 parts of polyethylene AC and 1.0 part of stearic acid being added at the 4-minute point in the hot mastication cycle. Polyethylene AC is a low molecular weight polyethylene lubricant having a molecular weight of about 1500-2000, a density of about 0.92-0.93 and a melting point in the range of about 88-100° C. The temperature of the mixer was allowed to rise to 160° C. and controlled at that temperature throughout the rest of the mixing cycle. The dump temperature of the compound was 168° C. After cooling, 14.1 parts of Kenmix AC-104 curative mixture were blended into the compound on a cold mill. The thus prepared compound was used experimentally to cover a 1200 foot length of electric cable in a commercial plant. The compound extruded smoothly onto the cable without any sag or deformation and cured satisfactorily in the CV tube.

Samples of the cable were coiled and exposed to 50 parts per hundred million of ozone for 500 hours as per ASTM procedure D470 and showed no signs of cracking.

Two samples of the cable were immersed for lengths of 50 feet in tap water at 10-30° C. for 24 hours with the water being held at 15.6° C. for the last hour. A 5-minute A.C. dielectric strength test potential (5000 volts) was then applied as per Canadian Standards Association specification C22, No. 38, 1955. There was no breakdown.

The cable was tested for water absorption in accordance with Insulated Power & Cable Engineers Association Publication No. S-19-81 (third edition, 1959), Part 6, page 13, April 1961, test method for accelerated water absorption. Samples of the cable were immersed in water for 168 hours at 70° C. and the amount of water which was absorbed was determined. This was an excellent 6.1 milligrams per square inch. Most specifications allow 15 milligrams per square inch for dielectrics and 20 milligrams per square inch for jackets.

These results demonstrate the satisfactory properties possessed by the compounds treated according to the present invention.

EXAMPLE 8

A crystalline polypropylene having a density of 0.91, a melting point of about 135° C. and a melt index of about 2.5 and a polyethylene having a density of 0.914, a melt index of 7.8 and a melting point of 106° C. were each blended in various proportions with an isobutyleneisoprene copolymer butyl rubber characterized by a 3.0 mole percent unsaturation and an ML-8-100° C. Mooney of 45 and with various proportions of trichloromelamine and zinc oxide as indicated in Table VII. The blending was performed on a mill with roll temperatures of about 120° C. The rolls were then heated to about 155° C. and the mastication was continued for 15 minutes. The mill roll temperatures were then lowered to about 25° C. and the masticated blends were compounded, vulcanized and tested as indicated in Table VII.

Table VII

| Blend | 1 | 2 | 3 | 4 |
|---|---|---|---|---|
| Butyl rubber | 80 | 80 | 80 | 80 |
| Polypropylene | 20 | | 20 | |
| Polyethylene | | 20 | | 20 |
| Zinc oxide | 2.5 | | 2.5 | |
| Trichloromelamine | 1 | | 1 | |

Prepare blend with roll temperatures of 120° C. Band butyl; add homopolymer and mix till homogeneous; add chemicals; mix for 3 minutes and sheet off. Heat rolls to 155° C.; add blend and masticate for 15 minutes with ¾ cuts from each side each minute. Compound as follows on cold (25° C.) mill.

| | 1 | 2 | 3 | 4 |
|---|---|---|---|---|
| Zinc oxide | 5 | 5 | 5 | 5 |
| Stearic acid | 1 | 1 | 1 | 1 |
| Whitetex #2 | 100 | 100 | 100 | 100 |
| Kenmix AC-104 | 23.6 | 23.6 | 23.6 | 23.6 |
| Blend ML-8-100° C. Mooney | 34 | 44 | 71 | 81 |

Cure for 40 minutes at 145° C.

| | 1 | 2 | 3 | 4 |
|---|---|---|---|---|
| Tensile strength (p.s.i.) | 805 | 695 | 930 | 765 |
| Elongation at break (percent) | 330 | 380 | 130 | 100 |
| Modulus at 100% elong. (p.s.i.) | 695 | 540 | 875 | |
| Hardness (Shore $A_2$ Inst.) | 67 | 68 | 67 | 72 |
| Ozone resistance, time in hours to first crack at strain: | | | | |
| 0–10% | >500 | >500 | >500 | >500 |
| 10–20% | >500 | 360 | 500 | 48 |
| 20–30% | >500 | 24 | 48 | 24 |
| 30–40% | 360 | 24 | 24 | 24 |
| Threshold strain (percent) | 32 | 13 | 12 | 14 |
| Deepest crack in inches after 500 hours' exposure to ozone at strain: | | | | |
| 0–10% | 0 | 0 | 0 | 0 |
| 10–20% | 0 | 0.02 | <0.01 | <0.01 |
| 20–30% | 0 | 0.10 | 0.04 | 0.13 |
| 30–40% | 0.14 | 0.14 | 0.09 | 0.14 |

EXAMPLE 9

The procedure of Example 8 was repeated using a different proportion of polymers and different compounding agents. The results are summarized in Table VIII.

Table VIII

| Blend | 1 | 2 | 3 | 4 |
|---|---|---|---|---|
| Butyl rubber | 75 | 75 | 75 | 75 |
| Polypropylene | 25 | 25 | 25 | 25 |
| Zinc oxide | 2.5 | 2.5 | | |
| Trichloromelamine | 1 | 1 | | |

Prepare blend on cold (25° C.) mill. Charge each blend into an internal mixer at 150° C. and masticate while allowing temperature to rise to about 168° C. and hold at this temperature while continuing mastication for 10 minutes. Remove and cool the blends, then compound on cold mill as follows:

| | 1 | 2 | 3 | 4 |
|---|---|---|---|---|
| EPC carbon black | 50 | | 50 | |
| Whitetex #2 | | 100 | | 100 |
| Zinc oxide | 5 | 5 | 5 | 5 |
| Stearic acid | 3 | 1 | 3 | 1 |
| Kenmix AC-104 | | 23.6 | | 23.6 |
| Benzothiazyl disulfide | 0.5 | | 0.5 | |
| Tetramethyl thiuram disulfide | 1 | | 1 | |
| Sulfur | 2 | | 2 | |
| Blend ML-8-100° C. Mooney | 61 | | 64 | |
| Cure for 40 minutes at —° C | 153 | 145 | 153 | 145 |
| Tensile strength (p.s.i.) | 2,510 | 1,060 | 3,370 | 1,630 |
| Elongation at break (percent) | 130 | 110 | 125 | 90 |
| Modulus at 100% elong. (p.s.i.) | 2,160 | 2,065 | 2,995 | |
| Hardness (Shore $A_2$ Inst.) | 83 | 78 | 85 | 81 |
| Ozone resistance, time in hours to first crack at strain, percent: | | | | |
| 0–10 | >500 | >500 | >500 | >500 |
| 10–20 | 96 | >500 | 432 | >500 |
| 20–30 | 96 | >500 | 168 | 480 |
| 30–40 | 96 | 336 | 168 | 366 |
| Threshold strain | 13 | 32 | 14 | 28 |
| Deepest crack in inches after 500 hours' exposure to ozone at strain, percent: | | | | |
| 0–10 | 0 | 0 | | 0 |
| 10–20 | <0.01 | 0 | <0.07 | 0 |
| 20–30 | 0.07 | 0 | <0.01 | <0.01 |
| 30–40 | 0.10 | 0.02 | 0.10 | 0.01 |

EXAMPLE 10

The procedure of Example 8 was repeated using different heat mastication and compounding conditions and using an amorphous polyethylene having a density of 0.92 and a melt index of 2.0. The results are summarized in Table IX.

Table IX

| Blend | 1 | 2 | 3 | 4 |
|---|---|---|---|---|
| Butyl rubber | 75 | 75 | 60 | 60 |
| Polypropylene | 25 | 25 | | |
| Polyethylene | | | 40 | 40 |
| Zinc oxide | 2 | 2 | 2 | 2 |
| Pronar [1] | 1 | 1 | | |
| Trichloromelamine | | | 1.5 | 1.5 |

Blend and masticate in an internal mixer set at 138° C. for 8 minutes, then sheet out on a hot mill and granulate. Compound in an internal mixer set at 138° C. as follows:

| | 1 | 2 | 3 | 4 |
|---|---|---|---|---|
| Whitetex #2 | 50 | | 50 | |
| MT carbon black | | 50 | | 50 |
| Kenmix AC-104 | 23.5 | 23.5 | 23.5 | 23.5 |
| Max. compounding temp. (° C.) | 171 | 174 | | |

Cure for 40 minutes at 166° C.

| | 1 | 2 | 3 | 4 |
|---|---|---|---|---|
| Tensile strength (p.s.i.) | 1,230 | 1,550 | 780 | 1,030 |
| Elongation at break (percent) | 140 | 120 | 300 | 280 |
| Modulus at 100% elong. (p.s.i.) | 1,080 | 1,450 | 610 | 690 |
| Hardness (Shore $A_2$ Inst.) | 82 | 81 | 86 | 85 |
| Tear strength (lbs./inch) | 140 | 140 | 140 | 130 |
| Ozone resistance, time in hours to first crack at strain, percent: | | | | |
| 10–20 | >500 | >500 | >500 | >500 |

[1] Pronar—trademark for a mixture believed to contain 50 parts hexachloromelamine and 50 parts inert base.

We claim:

1. A process comprising blending 5–95 parts by weight of a solid homopolymer of a $C_2$–$C_5$ alpha-monoolefine, 95–5 parts by weight of a rubbery copolymer of isobutylene and at least one copolymerizable $C_4$–$C_{14}$ diolefinic hydrocarbon containing 80–99.9 mole percent copolymerized isobutylene, and 0.1–3.0 parts by weight per 100 parts by weight of total polymers of a halomelamine, masticating the blend at 120–200° C. for 1–30 minutes, lowering the temperature of the masticated blend to a point where vulcanization of the rubbery isobutylene-diolefinic hydrocarbon copolymer is substantially negligible, mixing into the cooled blend a vulcanizing agent for the rubbery isobutylene-diolefinic hydrocarbon copolymer component of the blend, and shaping and vulcanizing the thus prepared blend.

2. The process as claimed in claim 1 wherein 1–20 parts by weight of zinc oxide, per 100 parts by weight of total polymers, are present in the blend during the hot mastication step.

3. The process as claimed in claim 2 wherein the diolefinic hydrocarbon comprises isoprene.

4. The process as claimed in claim 3 wherein the halomelamine is a chloromelamine.

5. The process as claimed in claim 4 wherein the chloromelamine is trichloromelamine.

6. The process as claimed in claim 4 wherein the chloromelamine is hexachloromelamine.

7. A process comprising blending 5–95 parts by weight of a solid polyethylene, 95–5 parts by weight of a rubbery copolymer of isobutylene and at least one copolymerizable $C_4$–$C_{14}$ diolefinic hydrocarbon containing 80–99.9 mole percent copolymerized isobutylene and 0.1–3.0 parts by weight per 100 parts by weight of total polymers of a halomelamine, masticating the blend at 120–200° C. for 1–30 minutes, lowering the temperature of the masticated blend to a point where vulcanization of the rubbery isobutylene-diolefinic hydrocarbon copolymer is substantially negligible, mixing into the cooled blend a vulcanizing agent for the rubbery isobutylene-diolefinic hydrocarbon copolymer component of the blend, and shaping and vulcanizing the thus prepared blend.

8. The process as claimed in claim 7 wherein 1–20 parts by weight of zinc oxide, per 100 parts by weight of total polymers, are also present in the blend during the hot mastication step.

9. The process as claimed in claim 8 wherein the diolefinic hydrocarbon comprises isoprene.

10. The process as claimed in claim 9 wherein the halomelamine is a chloromelamine.

11. The process as claimed in claim 10 wherein the chloromelamine is trichloromelamine.

12. The process as claimed in claim 10 wherein the chloromelamine is hexachloromelamine.

13. A process comprising blending 30–50 parts by weight of a solid polyethylene, 70–50 parts by weight of a rubbery copolymer of isobutylene and isoprene containing 97.0–99.9 mole percent copolymerized isobutylene, 0.1–3.0 parts by weight of trichloromelamine, and 1–20 parts by weight of zinc oxide, said parts of trichloromelamine and zinc oxide being parts by weight of total polymers, raising the temperature of the blend to 120–200° C. and masticating it for 1–30 minutes, lowering the temperature of the masticated blend to a point where vulcanization of the rubbery isobutylene-isoprene copolymer is substantially negligible, mixing into the cooled blend a vulcanizing agent for the rubbery isobutylene isoprene copolymer, and shaping and vulcanizing the thus prepared blend.

14. The process as claimed in claim 13 wherein 0.2–1.75 parts of trichloromelamine and 1–10 parts of zinc oxide are present in the blend, the hot mastication step is carried out at 120–180° C. for 5–20 minutes and the temperature of the hot masticated blend is lowered to less than about 105° C. prior to the incorporation of the vulcanizing agent for the rubbery isobutylene-isoprene copolymer component of the blend.

15. A process comprising blending 20–25 parts by weight of a solid polypropylene, 80–75 parts by weight of a rubbery copolymer of isobutylene and at least one copolymerizable $C_4$–$C_{14}$ diolefinic hydrocarbon containing 80–99.9 mole percent copolymerized isobutylene and 0.1–3.0 parts by weight per 100 parts by weight of total polymers of a halomelamine, masticating the blend at 120–200° C. for 1–30 minutes, lowering the temperature of the masticated blend to a point where vulcanization of the rubbery isobutylene-diolefinic hydrocarbon copolymer is substantially negligible, mixing into the cooled blend a vulcanizing agent for the rubbery isobutylene-diolefinic hydrocarbon copolymer component of the blend, and shaping and vulcanizing the thus prepared blend.

16. The process as claimed in claim 15 wherein 1–20 parts by weight of zinc oxide, per 100 parts by weight of total polymers, are also present in the blend during the hot mastication step.

17. The process as claimed in claim 16 wherein the diolefinic hydrocarbon comprises isoprene.

18. The process as claimed in claim 17 wherein the halomelamine is a chloromelamine.

19. The process as claimed in claim 18 wherein the chloromelamine is trichloromelamine.

20. The process as claimed in claim 18 wherein the chloromelamine is hexachloromelamine.

21. A process as claimed in claim 19 wherein the rubbery copolymer is a copolymer of isobutylene and isoprene containing 97.0–99.9 mole percent copolymerized isobutylene.

22. The process as claimed in claim 20 wherein the rubbery copolymer is a copolymer of isobutylene and isoprene containing 97.0–99.9 mole percent copolymerized isobutylene.

23. A vulcanized composition comprising a hot masticated blend of 5–95 parts by weight of a solid homopolymer of a $C_2$–$C_5$ alpha-monoolefine, 95–5 parts by weight of a rubbery copolymer of isobutylene and at least one copolymerizable $C_4$–$C_{14}$ diolefinic hydrocarbon containing 80–99.9 mole percent copolymerized isobutylene, and 0.1–3.0 parts by weight per 100 parts by weight of total polymers of a halomelamine.

24. A vulcanized composition as claimed in claim 23 wherein the hot masticated blend contains 1–20 parts by weight of zinc oxide per 100 parts by weight of total polymers.

25. A vulcanized composition comprising a hot masticated blend of 30–50 parts by weight of a solid polyethylene, 70–50 parts by weight of a rubbery copolymer of isobutylene and isoprene containing 97.0–99.9 mole percent copolymerized isobutylene, 0.1–3.0 parts by weight of a halomelamine selected from the group consisting of tri- and hexa-chloromelamine, and 1–20 parts by weight of zinc oxide, said parts of chloromelamine and zinc oxide being parts by weight per 100 parts by weight of total polymers.

No references cited.

SAMUEL H. BLECH, *Primary Examiner.*